United States Patent
Falk et al.

(10) Patent No.: US 9,143,935 B2
(45) Date of Patent: Sep. 22, 2015

(54) METHOD FOR MANAGING A COUNTER STATUS ALLOCATED TO A PAIR COMPRISING A COMMUNICATION TERMINAL AND A BASE STATION

(75) Inventors: Rainer Falk, Eching (DE); Christian Günther, Neubiberg (DE); Dirk Kröselberg, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 637 days.

(21) Appl. No.: 12/086,621

(22) PCT Filed: Dec. 6, 2006

(86) PCT No.: PCT/EP2006/069379
§ 371 (c)(1),
(2), (4) Date: Apr. 2, 2009

(87) PCT Pub. No.: WO2007/068638
PCT Pub. Date: Jun. 21, 2007

(65) Prior Publication Data
US 2009/0327475 A1 Dec. 31, 2009

(30) Foreign Application Priority Data
Dec. 14, 2005 (DE) .......................... 10 2005 059 827

(51) Int. Cl.
*G06F 15/173* (2006.01)
*H04W 12/06* (2009.01)
(Continued)

(52) U.S. Cl.
CPC .............. *H04W 12/06* (2013.01); *H04L 63/08* (2013.01); *H04L 63/1466* (2013.01); *H04W 84/12* (2013.01)

(58) Field of Classification Search
CPC .... H04L 63/08; H04L 63/1441; H04W 8/005
USPC .......................................... 709/224; 713/170
See application file for complete search history.

(56) References Cited

U.S. PATENT DOCUMENTS 6,188,905 B1 * 2/2001 Rudrapatna et al. ....... 455/452.2
6,754,482 B1 6/2004 Torabi
(Continued)

FOREIGN PATENT DOCUMENTS

DE 10162554 A1 7/2003
KR 2001-0078273 8/2001
KR 2005-0084265 8/2005

OTHER PUBLICATIONS

IEEE Computer Society; 802.11i IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 6: Medium Access Control (MAC) Security Enhancements; IEEE Standards, Bd. 802.11, Seiten 1-175; New York; IEEE; Others; 2004; US.

(Continued)

*Primary Examiner* — Esther B Henderson
(74) *Attorney, Agent, or Firm* — Staas & Halsey LLP

(57) ABSTRACT

A counter status that is allocated to a communication terminal and a base station is usually deleted when the storage space in the respective base station is used up. To address this, the counter status is saved in an additional communication network element when a predefinable criterion is met, and can thus be retrieved.

20 Claims, 1 Drawing Sheet

(51) Int. Cl.
*H04L 29/06* (2006.01)
*H04W 84/12* (2009.01)

(56) References Cited

U.S. PATENT DOCUMENTS

| | | | |
|---|---|---|---|
| 6,966,003 | B1 | 11/2005 | Joseph et al. |
| 7,178,041 | B2 * | 2/2007 | Asokan et al. ............... 713/194 |
| 7,627,122 | B1 * | 12/2009 | Horn et al. ................... 380/270 |
| 2003/0130946 | A1 | 7/2003 | Gabrysch |
| 2004/0103282 | A1 | 5/2004 | Griswold |
| 2005/0271209 | A1 | 12/2005 | Gung |
| 2005/0286461 | A1 | 12/2005 | Zhang et al. |
| 2006/0209689 | A1 * | 9/2006 | Nakano et al. ............... 370/230 |
| 2007/0005972 | A1 * | 1/2007 | Mizikovsky et al. ......... 713/171 |
| 2007/0076650 | A1 * | 4/2007 | Manjeshwar et al. ........ 370/328 |

OTHER PUBLICATIONS

Internet www.WiMAXforum.org.
IEEE 802.16e—2005 IEEE Std. 802.16-2004/Cor 1-2005; Others.
German Search Report (dated Sep. 14, 2006).
Korean Office Action issued May 3, 2013 for corresponding Korean Application No. 10-2008-701939.

* cited by examiner

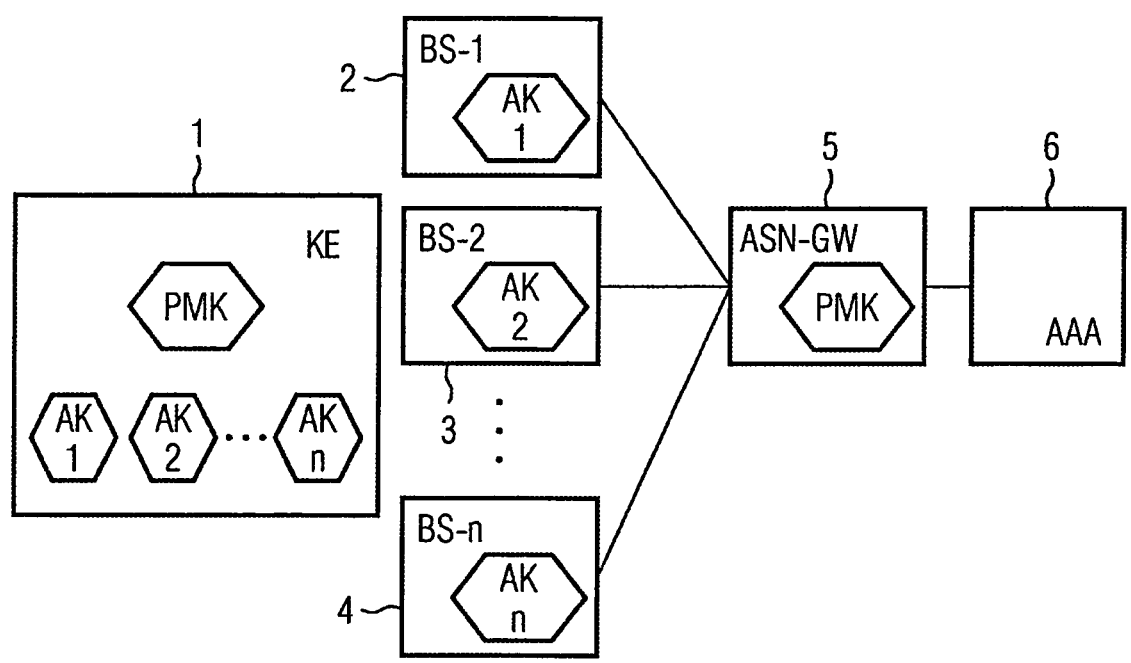

METHOD FOR MANAGING A COUNTER STATUS ALLOCATED TO A PAIR COMPRISING A COMMUNICATION TERMINAL AND A BASE STATION

CROSS REFERENCE TO RELATED APPLICATIONS

This application is based on and hereby claims priority to German Application No. 10 2005 059 827.7 filed on Dec. 14, 2005 and PCT Application No. PCT/EP2006/069379 filed on Dec. 6, 2006, the contents of which are hereby incorporated by reference.

BACKGROUND

The invention relates to a method for managing a counter status.

To promote the compatibility and interoperability of broadband wireless communication networks, several interested parties have amalgamated to form the so-called WiMax Forum (www.wiMaxforum.org). One objective of this forum is to create a standard which allows mobile communication terminals to be able to access different communication networks.

Provision is made here for a pairwise master key to be set up during a network registration of a communication subscriber, for instance according to the extensible authentication protocol. An authentication key which differs for each pair comprising a communication terminal and a base station is derived from this pairwise master key. This authentication key is used for Management messages for instance. With each communication process, in other words either when sending a message from the communication terminal to the base station or when receiving a message through the communication terminal from the base station (Uplink/Downlink), a counter status allocated to this authentication key is increased. This counter status is thus unique to a certain pair comprising a communication terminal and a base station and can thus be used to ensure the authenticity of the communication terminal. This is used for instance to safeguard against replay attacks, in which an unauthorized user could input intercepted messages into the communication network again.

The base station stores the allocated counter status for each authentication key in order to manage this counter status. Since the storage space for storing these counter statuses on a base station is however limited, it may be necessary to delete a counter status. Furthermore, the counter status may also get lost in another way, like data loss for instance. In this instance a handover, in other words a passing over of a communication link from one base station to another base station using the current pairwise master key is no longer possible, since otherwise replay attacks may not be ruled out. A renewed authentication by the extensible authentication protocol must thus be carried out in order to set up a new pairwise master key and finally to be able to derive new authentication keys once again from this. This results in delays and increased signaling, since such a renewed authentication is not carried out locally, but instead including the AAA server (Authentication, Authorization, Accounting) in the home network of the communication terminal.

SUMMARY

One potential object is thus to specify an improved management of counter statuses in a communication network, by which a more efficient management of the limited storage space on the base station is enabled.

The inventors propose that the counter status is allocated to a first communication subscriber and to a first communication network element in a method for managing a counter status in a communication network. The counter status is increased in a communication process between the first communication subscriber and the first communication element. When a predeterminable criterion is met, the counter status can be stored in a second communication network element. The counter status is herewith stored in the second communication network element in a manner such that it can be allocated to the first communication subscriber and to the first communication network element. This is advantageous in that a renewed authentication by way of the AAA server is not necessary as a result of exporting the counter status from the first communication network element to the second communication network element even after deleting the counter status on the first communication network element. The exported counter status can be retransmitted from the second communication network element to the first communication network element if it is needed in a handover.

The predeterminable criterion can be a predeterminable number of communication processes for instance or a minimum storage space which is still available in the first communication network element. The latter is advantageous in that the counter status is still ensured on the second communication network element shortly before deleting or overwriting a counter status.

Further authentication information of the first communication subscriber can preferably be stored on the second communication network element in addition to the counter status. By way of example, an authentication key context can be advantageously stored therewith, thereby facilitating a subsequent recovery of the authentication key.

In a further advantageous embodiment, the second communication network element stores individual communication processes between the first communication subscriber and first communication network elements. The second communication network element monitors a predeterminable criterion on the basis of the stored communication processes of the first communication subscriber. When the predeterminable criterion is met, the second communication network element deletes the counter statuses allocated to the first communication subscriber in at least one first communication network element or allows these to be deleted. As an alternative, the second communication network element prompts a notification concerning the counter statuses to at least one first communication network element. The storage space on the first communication network elements can thus be advantageously optimized since a decision is met by the second communication network element on the basis of the predeterminable criterion as to if a deletion of the counter status on a first communication network element is meaningful for instance.

The predeterminable criterion is a foreseeable or incurred end to a period of validity of the authentication information of the first communication subscriber for instance. The former counter status on the first communication network element is thus advantageously deleted if a reauthentication of a communication subscriber communication network relation is imminent and thus a new counter status is determined.

The predeterminable criterion can also be configured as new authentication information of the first communication subscriber, in other words, the former authentication information and thus the former counter status on the first communication network element can be deleted.

The predeterminable criterion can also be configured such that it is monitored on the basis of a movement profile of the first communication subscriber. This is advantageous for instance in that if a tendency of a movement direction of a first communication subscriber moves out of the range of a first communication network element, the counter status on this first communication network element can be deleted, since it is highly probable that a further need for this counter status can be ruled out.

The predeterminable criterion can also be monitored on the basis of a prioritization of first communication subscribers. This means that a decision is advantageously met for instance, on the basis of the protocol and/or services used, as to which counter status on the first communication element is deleted. Time-critical services (voice transmission) are especially prioritized, since an interruption would herewith be perceived by the user as disturbing. Contrary to time-non-critical services (surfing the web, downloading files), this is perceived as far less disturbing since only a short interruption occurs there, which only leads to an approximately longer duration in terms of data transmission.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows a schematic representation of a communication network with an allocation of the storage spaces of the pairwise master key and authentication keys.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

FIG. 1 shows a schematic design of a communication terminal 1 connected to a communication network. During the network registration of the communication terminal 1, a pairwise master key is set up within the scope of an extensible authentication protocol-based authentication including the AAA server 6 in the home network of the communication terminal 1. This primary master key is stored in the ASN-GW (Access Service Network Gateway) 5 of the visited communication network. An authentication key AK1, AK2, Akn is deduced on the basis of the pairwise master keys for each communication terminal 1 and base station 2, 3, 4 pair. In order inter alia to manage the counter allocated to an authentication key, the base station 2, 3, 4 creates an authentication key context for each authentication key AK1, AK2, AKn. The proposed method now provides for the AK context on the ASN-GW to be exported.

This applies in particular to the counter PN-U/D, since this can not be deduced again from the ASN-GW itself on the basis of the pairwise master key. The export of the AK context from the base station on the ASN-GW can be undertaken for instance according to a predeterminable number of communication processes or if the local storage space in the base station for storing AK contexts is full. To this end, a corresponding storage space is provided in the ASN-GW. In this exemplary embodiment, the first communication subscriber corresponds to the communication terminal, the first communication network element corresponds to the base station, the second communication network element corresponds to the ASN-GW and the counter status corresponds to the counters PN-U and PN-D.

The ASN-GW preferably allocates the pairwise master key to a stored AK context, from which pairwise master key the respective AK context was deduced. If the pairwise master key is deleted, due to reauthentication for instance, the AK contexts deduced therefrom are likewise deleted.

According to a further exemplary embodiment, the ASN-GW traces the history of a communication subscriber on the basis of the stored communication processes of the communication subscriber. This is carried out for instance in that the ASN-GW notices which base stations were sought by the communication subscriber. When the validity of the pairwise master keys has expired and/or a reauthentication is carried out, the ASN-GW directly deletes the stored AK contexts on the visited base station or sends a notification in which the respective memory is identified as releasable. This is advantageous in that the memory on the base stations is in some circumstances released earlier than was admissible for the maximum service life of the pairwise master keys and thus of the AK context.

According to a further embodiment variant, the ASN-GW knows the maximum number of AK contexts a base station is able to store and how many AK contexts are actually stored. If the storage space is now tight, the ASN-GW is able to reach a better decision using the history of the communication subscriber and the information which is currently available to the subscriber in order to find a communication subscriber for instance whose AK context can be deleted, which is no longer returned to this base station with higher probability than other subscribers. As an alternative, a base station whose storage space for storing AK contexts is reaching its end, can also actively inform the ASN-GW of this, whereupon the ASN-GW then deletes AK contexts on this base station and/or prompts the deletion thereof for instance. In this variant, the ASN-GW does not need to trace how many free storage spaces for storing AK contexts are still available on a base station.

One suitable criterion for selecting a communication subscriber, the AK contexts of which can be deleted, is the targeted movement of the communication subscriber in one direction away from the base station for instance. Furthermore, the current movement speed, movement space, the number of visited base stations or the remaining period of validity of the pairwise master keys of the communication subscriber can be included in an evaluation.

One additional criterion would be for AK contexts to have already been deleted for this communication subscriber on various spatially proximal base stations, so that a reauthentication is in any event necessary. This is advantageous in that not all communication subscribers need to be equally poorly handled in the event of inadequate storage space, but as a result of a suitable selection, at least some AK contexts remain, which are then also available on all base stations allocated to an ASN-GW.

A further advantage is that the proposed solution can be applied to previous communication protocols, without having to undertake huge modifications to the individual components of the communication network.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for managing a counter status in a communication network, comprising:
   including the counter status in authentication information;
   storing the counter status in a first communication network element, the counter status being allocated to a first communication subscriber and the first communication network element;
   increasing the counter status with individual communication processes between the first communication subscriber and the first communication network element;
   storing the counter status in a second communication network element when a predeterminable first criterion is met, the counter status being stored with information indicating it is allocated to the first communication subscriber and to the first communication network element;
   storing the individual communication processes in the second communication network element;
   monitoring, by a second communication subscriber, a predeterminable second criterion, on the basis of the stored communication processes; and
   when the predeterminable second criterion is met, deleting the counter status that is allocated to the first communication subscriber and stored in the first communication network element or prompting deletion of the counter status that is allocated to the first communication subscriber and stored in the first communication network element.

2. The method as claimed in claim 1, wherein the communication network is a World Wide Interoperability for Microwave Access (WiMax) radio network.

3. The method as claimed in claim 1, wherein
   the predeterminable first criterion is a predeterminable number of communication processes.

4. The method as claimed in claim 1, wherein the predeterminable second criterion is reaching a minimum available storage space in the first communication network element.

5. The method as claimed in claim 1, wherein both the counter status and authentication information for the first communication subscriber are stored in the second communication network element.

6. The method as claimed in claim 1, wherein the predeterminable second criterion is triggered based on an end to a period of validity of authentication information for the first communication subscriber.

7. The method as claimed in claim 1, wherein the predeterminable second criterion is triggered based on generation of new authentication information for the first communication subscriber.

8. The method as claimed in claim 1, wherein
   movement of the first communication subscriber is monitored to generate a movement profile for the first communication subscriber, and
   the predeterminable second criterion is set based on the movement profile for the first communication subscriber.

9. The method as claimed in claim 1, wherein
   there are a plurality of first communication subscribers,
   the first subscribers are prioritized, and
   the predeterminable second criterion is set based on prioritization of first communication subscribers.

10. The method of claim 9, wherein the predeterminable second criterion is set such that the counter status of a higher priority first communication subscriber is deleted less frequently than the counter status of a lower priority first communication subscriber.

11. The method as claimed in claim 1, wherein
   the first communication subscriber is a Mobile Subscriber Station,
   the first communication network element is a Base Station, and
   the second communication network element is a World Wide Interoperability for Microwave Access (WiMax) Access Service Network Gateway.

12. The method as claimed in claim 2, wherein
   the predeterminable first criterion is a predeterminable number of communication processes.

13. The method as claimed in claim 12, wherein the predeterminable second criterion is reaching a minimum available storage space in the first communication network element.

14. The method as claimed in claim 13, wherein both the counter status and authentication information for the first communication subscriber are stored in the second communication network element.

15. The method of claim 14, wherein the predeterminable second criterion is set such that the counter status of a higher priority first communication subscriber is deleted less frequently than the counter status of a lower priority first communication subscriber.

16. The method as claimed in claim 15, wherein
   the first communication subscriber is a Mobile Subscriber Station,
   the first communication network element is a Base Station, and
   the second communication network element is a World Wide Interoperability for Microwave Access (WiMax) Access Service Network Gateway.

17. The method as claimed in claim 16, wherein the predeterminable second criterion is triggered based on an end to a period of validity of authentication information for the first communication subscriber.

18. The method as claimed in claim 16, wherein the predeterminable second criterion is triggered based on generation of new authentication information for the first communication subscriber.

19. The method as claimed in claim 16, wherein
   movement of the first communication subscriber is monitored to generate a movement for the first communication subscriber, and
   the predeterminable second criterion is set based on the movement profile for the first communication subscriber.

20. The method as claimed in claim 16, wherein
   there are a plurality of first communication subscribers,
   the first subscribers are prioritized, and
   the predeterminable second criterion is set based on prioritization of first communication subscribers.

* * * * *